(12) United States Patent
Liu

(10) Patent No.: US 10,761,628 B2
(45) Date of Patent: Sep. 1, 2020

(54) TOUCH CONTROL SYSTEM OF ELECTRONIC PRODUCT IN UNDERWATER ENVIRONMENT

(71) Applicant: Divevolk (Zhuhai) Intelligence Tech Co., Ltd, Zhuhai, Guangdong (CN)

(72) Inventor: Songdong Liu, Guangdong (CN)

(73) Assignee: Divevolk (Zhuhai) Intelligence Tech Co., Ltd, Zhuhai (CN)

( * ) Notice: Subject to any disclaimer, the term of this patent is extended or adjusted under 35 U.S.C. 154(b) by 0 days.

(21) Appl. No.: 16/234,629

(22) Filed: Dec. 28, 2018

(65) Prior Publication Data

US 2019/0129529 A1   May 2, 2019

Related U.S. Application Data

(63) Continuation of application No. PCT/CN2017/089466, filed on Jun. 22, 2017.

(30) Foreign Application Priority Data

Jun. 30, 2016   (CN) .................... 2016 2 0687656 U

(51) Int. Cl.
| | |
|---|---|
| *G06F 3/041* | (2006.01) |
| *A45C 11/22* | (2006.01) |
| *G06F 3/039* | (2013.01) |
| *A45C 11/00* | (2006.01) |
| *G06F 1/16* | (2006.01) |
| *G06F 1/18* | (2006.01) |

(52) U.S. Cl.
CPC .............. *G06F 3/041* (2013.01); *A45C 11/00* (2013.01); *A45C 11/22* (2013.01); *G06F 1/1613* (2013.01); *G06F 1/182* (2013.01); *G06F 3/0393* (2019.05); *A45C 2011/002* (2013.01); *G06F 2203/04103* (2013.01)

(58) Field of Classification Search
CPC ... A45C 11/00; A45C 11/22; A45C 2011/002; G06F 1/1613; G06F 1/182; G06F 2203/04103; G06F 3/0393; G06F 3/041
See application file for complete search history.

(56) References Cited

U.S. PATENT DOCUMENTS

| | | | | |
|---|---|---|---|---|
| 9,788,620 | B1 * | 10/2017 | Parkinson | ............... A45C 11/00 |
| 2009/0260844 | A1 * | 10/2009 | Tseng | .................... G03B 17/08 |
| | | | | 174/50.5 |

(Continued)

*Primary Examiner* — Hong Zhou

(57) ABSTRACT

Provided is a touch control system of an electronic product in underwater environment. The touch control system includes a sealing device which is configured to accommodate the electronic product. The sealing device includes a sealed chamber interlayer and a sealed shell. Herein the sealed chamber interlayer is opposite to the touch screen of the electronic product and is capable of being pressed and rebounded and is transparent, and the sealed shell is connected with the sealed chamber interlayer in a sealing manner. The sealed chamber interlayer covers a surface of the touch screen completely. The sealed shell covers other surfaces of the electronic product, and implements touch control to the touch screen by applying an external force to the sealed chamber interlayer. Underwater high-accuracy maneuverability of the touch screen of the electronic product may be implemented when an external force is applied to the sealed chamber interlayer by a finger.

12 Claims, 8 Drawing Sheets

(56) References Cited

U.S. PATENT DOCUMENTS

| | | | |
|---|---|---|---|
| 2010/0310194 A1* | 12/2010 | Archambault | A45C 11/22 383/42 |
| 2011/0187204 A1* | 8/2011 | Lacey | H03K 17/96 307/139 |
| 2012/0256867 A1* | 10/2012 | Annacone | G06F 3/044 345/174 |
| 2012/0262618 A1* | 10/2012 | Weakly | A45C 11/00 348/333.01 |
| 2013/0027849 A1* | 1/2013 | Berumen | A45C 11/00 361/679.01 |
| 2015/0189963 A1* | 7/2015 | Lai | A45C 13/008 224/191 |
| 2015/0217843 A1* | 8/2015 | Leinikki | B63C 11/02 345/174 |
| 2015/0334855 A1* | 11/2015 | Chu | H04R 1/2834 224/191 |

\* cited by examiner

TOUCH CONTROL SYSTEM OF ELECTRONIC PRODUCT IN UNDERWATER ENVIRONMENT

CROSS REFERENCE TO RELATED APPLICATIONS

The present application is a Continuation Application of PCT Application No. PCT/CN2017/089466 filed on Jun. 22, 2017, which claims the benefit of Chinese Patent Application No. 201620687656.X filed on Jun. 30, 2016. All the above are hereby incorporated by reference.

TECHNICAL FIELD

The disclosure relates to the field of electronic products used underwater, in particular to a touch control system of the electronic product in an underwater environment.

BACKGROUND

Electronic products have entered into all fields and all places of people's lives, including underwater environment. For example, when diving and swimming, people also hope to keep communication with the outside world. However, in terms of selection of a touch control screen in the field of the electronic products, a capacitive touch screen is most commonly used at present, and an operating principle is as follows: when a conductive object (such as a finger of a human body) is close to a surface of a touch screen within a certain distance, a local coupling capacitance may be formed between the finger and the touch screen, thereby changing a charge distribution amount of a corresponding location in the touch screen. In this way, the location that the finger touches may be perceived, and accordingly an instruction may be formed. Water in nature is a conductive material. Therefore, when the surface of the touch screen has a certain amount of water drops and even is completely covered with the water, operation of the finger to the touch screen may be influenced and even trapped in failure completely.

Thus, how to prevent the touch screen from influence (such as in the rain, under the water and other environments) has become a practical need. Taking operations and underwater waterproofing of the touch screen of a smart cell phone for instance, the related art includes the following ways.

The way of a waterproof shell: (1) an overall rigid waterproof shell has good sealing reliability and pressure resistance, however the touch screen may not be operated. (2) A local soft waterproof shell has the soft waterproof shell on an opposite side of the touch screen, with common tightness. Depending on tension of a material of a soft side, the soft waterproof shell resists a pressure of water, therefore the pressure resistance is poor, and it is applicable to a water depth less than 5 m generally. The soft waterproof shell has extremely poor touch effect and may not implement normal touch operation fully. (3) An inflatable and local soft waterproof shell may be applicable to the water depth of 10-30 m generally. However, the touch screen has the extremely poor operability because a soft part may swell as a result of a great positive pressure formed in the shell due to air inflation in advance before placed in water. Furthermore, along the change of the water depth, air in the shell may be compressed and degree of swelling may be changed. In this way, hand feel when operating the touch screen will be changed greatly, and an error operation may occur easily. The soft side may have short service life due to easy deformation, and accordingly a device may have poor pressure resistance.

The way of a waterproof bag: although certain operation of the touch screen may be implemented, the waterproof bag has extremely poor operability, poor sealing reliability and short service life, is applicable to shallow water depth, and would basically not resist the pressure.

Without any other waterproof devices, waterproofing of the smart cell phone and underwater operation of the bare touch screen have high requirements to development difficulty, cycle and cost of the technology itself. Moreover, the applicable water depth and reliability of this kind of latest products on the market at present should be verified and subjected to tests of the market.

SUMMARY

In allusion to the problems in the related art, the disclosure provides a touch control system of an electronic product in underwater environment. The touch control system has good tightness, pressure resistance and long service life, and may implement underwater high-accuracy maneuverability of a touch screen of the electronic product.

In order to implement the mentioned objective, the disclosure takes the following technical solutions.

A touch control system of the electronic product in the underwater environment includes a sealing device which is configured to accommodate the electronic product. The sealing device includes a sealed chamber interlayer and a sealed shell. Herein, the sealed chamber interlayer is opposite to the touch screen of the electronic product and is capable of being pressed and rebounded and is transparent, and sealed shell is connected with the sealed chamber interlayer in a sealing manner. The sealed chamber interlayer covers a surface of the touch screen completely. The sealed shell covers other surfaces of the electronic product, and implements touch control to the touch screen by applying an external force to the sealed chamber interlayer. A sealed chamber in the sealed chamber interlayer is filled with an insulated fluid material.

Preferably, there are one or more sealed chamber interlayers. A single sealed chamber interlayer is provided with a top insulated sealing film and a bottom insulated sealing film, and multiple sealed chamber interlayers are provided with at least one intermediate insulated sealing film which is positioned between the top insulated sealing film and the bottom insulated sealing film. The sealed chamber is arranged between the top insulated sealing film and the bottom insulated sealing film, or/and between the top insulated sealing film and the intermediate insulated sealing film, or/and between two adjacent intermediate insulated sealing films, or/and between the intermediate insulated sealing film and the bottom insulated sealing film.

Preferably, the paired top insulated sealing films or the paired bottom insulated sealing films or the paired intermediate insulated sealing films are separated through a separator. The separator is arranged on an edge of the top insulated sealing film or the bottom insulated sealing film or the intermediate insulated sealing film, for supporting the top insulated sealing film or the intermediate insulated sealing film.

Preferably, the separator and the top insulated sealing film or the bottom insulated sealing film or the intermediate insulated sealing film may be molded through adhesion or hot melt connection or ultrasonic welding or insert molding.

Preferably, the paired top insulated sealing films or the paired bottom insulated sealing films or the paired intermediate insulated sealing films are subjected to the direct adhesion or the hot melt connection or the ultrasonic welding.

Preferably, a thickness of the top insulated sealing film and the bottom insulated sealing film in the single sealed chamber interlayer or a sum of the thicknesses of the top insulated sealing films, the intermediate insulated sealing films and the bottom insulated sealing films in the multiple sealed chamber interlayers is less than or equal to an effective distance of local sensing of the touch screen. Furthermore, a thickness of the single sealed chamber interlayer or the multiple sealed chamber interlayers is greater than or equal to the effective distance of overall sensing of the touch screen.

Preferably, the sum of the thicknesses of the top insulated sealing film and the bottom insulated sealing film is 0.2 mm and above, and 1.0 mm and below. A total thickness of the single sealed chamber interlayer is 5 mm and below.

Preferably, a surface of the top insulated sealing film is a touched side of the sealed chamber interlayer, and its inner side is provided with an inner insulated sealing film. The inner insulated sealing film is adhered to the top insulated sealing film.

Preferably, a surface of the sealed chamber interlayer close to the touch screen leans against the touch screen naturally. When pressing the sealed chamber interlayer locally, the insulated fluid material in the pressed part would be displaced by a pressure in a flowing manner, to implement touch control to the touch screen of the electronic product.

Preferably, an air clearance with uniform thickness is arranged between the surface of the sealed chamber interlayer close to the touch screen and the touch screen. The air clearance communicates with a charging/discharging device outside the sealing device.

Preferably, a thickness of the air clearance is 0-0.8 mm.

Preferably, a size of a chamber which is configured to accommodate the electronic product in the sealing device is greater than an overall size of the electronic product, and the clearance is reserved between the two, for ventilation between the charging/discharging device and the air clearance.

Preferably, the charging/discharging device is one or more sealed airbags. Rigidity or tension of a material of the airbag is less than that of the material of the sealed chamber interlayer and the sealed shell.

Preferably, the airbag and the sealing device are set integrally and the airbag covers external surfaces of other parts of the sealing device, except locations corresponding to operable functional parts of the electronic product. The edge or the side of the sealing device communicates with the airbag.

Preferably, the airbag communicates with the sealing device through an air pipe, and the air pipe is connected with the airbag and the sealing device through connectors in a fastening manner.

Preferably, the connector is permanently or detachably connected with the sealing device. When the connector is not connected with the air pipe, an interface of the connector is plugged with a plugging head.

Preferably, part of the airbag communicates with the sealing device through the air pipe, and another part of the airbag is directly connected with the sealing device in a sealing manner.

Preferably, multiple airbags communicate with the sealing device in series or in parallel.

Preferably, at least one of the airbags is configured to be wearable on the human body, and the airbag is fixed on the human body through a magic tape or a silica gel bandage or a rubber bandage.

Preferably, at least one of the airbags is configured as a wrist strap which may be detachably worn on a human wrist.

Preferably, at least one of the airbags is accommodated in a protective shell prepared from a hard material, the protective shell is connected with the sealed shell of the sealing device in a repeatedly detachable manner; and the protective shell is provided with at least one through hole and a gap, thereby making the airbag communicate with the outside world.

Preferably, part of a surface of the airbag is rough and uneven. Herein a space is reserved between a concave part of the airbag and a wall of the airbag on another side, for ventilation.

Preferably, the airbag is produced through integrated molding, split-type hot melt connection or the ultrasonic welding or the adhesion.

Preferably, the charging/discharging device includes a high-pressure cylinder, a water pressure sensor and a charging/discharging valve. Along a change of a water depth, the air is charged into and discharged from the sealing device through the charging/discharging device, thereby balancing an internal pressure and an external pressure of the sealing device, and accordingly keeping the sealed chamber interlayer flat all the time.

Preferably, the insulated fluid material is silicone oil or glycerol or other fluid materials with ultralow conductivity and specific gravity which is equivalent with that of water.

Preferably, a decorative or an entertainment additive is added to the insulated fluid material.

Preferably, a location of the sealed shell opposite to a power button of the electronic product is hollow, and a power switch protective film which is capable of being pressed and rebounded is embedded at a hollow place in a sealing manner.

Preferably, a part of the sealing device opposite to a camera of the electronic product is provided with a non-opaque lens cover.

Preferably, the sealed shell part of the sealing device opposite to the camera of the electronic product is molded from a hard and transparent material.

Preferably, the part of the sealing device corresponding to an acoustic output or/and receiving location of the electronic product is thinner than any other part.

Preferably, the sealed shell forms a frame body on the edge of the touch screen, and the sealed chamber interlayer is surrounded on a peripheral edge of the sealed shell by the frame body in a sealing manner.

Preferably, the sealing device is provided with a mechanical button component corresponding to a mechanical key of the electronic product.

Preferably, the mechanical button component includes a button, a press block and a soft sealing gasket. The button is subjected to press fit on the sealed shell by the press block, and the place between the button and the mechanical key is sealed by the soft sealing gasket.

Preferably, the press block and the soft sealing gasket are fixed on the sealed shell through the adhesion or the hot melt connection or the ultrasonic welding or the insert molding.

Preferably, a mobile clearance is arranged between the button and the press block and the sealed shell, for allowing the button to move inward and accordingly press the soft sealing gasket. In this way, the mechanical key is triggered.

Preferably, the sealing device is provided with an induction button component corresponding to an induction key of the electronic product.

Preferably, the induction button component includes a button, a press block, a soft sealing gasket and an inductor. The button is subjected to press fit between the press block and the soft sealing gasket. The soft sealing gasket and the press block are fixed on the sealed shell, and the inductor is fixed between the soft sealing gasket and the induction key. When pressing the button, the soft sealing gasket and the inductor are pushed to move, thereby triggering the induction key.

Preferably, one side of the soft sealing gasket facing the induction key is connected with a guide body. The guide body is fixed on the sealed shell, and located at periphery of the inductor to guide the inductor to move.

Preferably, the press block, the soft sealing gasket and the guide body are fixed on the sealed shell through the adhesion or the hot melt connection or the ultrasonic welding or the insert molding.

Preferably, the inductor uses a solid conductive material.

Preferably, the soft sealing gasket uses silica gel or other soft materials.

Preferably, the sealed shell is a rigid shell.

The disclosure has the following beneficial effects.

The sealing device is arranged outside the electronic product, and the sealing device and the touch screen are oppositely provided with the sealed chamber interlayer which is capable of being pressed and rebounded. The sealed chamber in the sealed chamber interlayer is filled with the insulated fluid material, thereby isolating the touch screen of the electronic product from the water in the environment and ensuring tightness. Therefore, the touch screen would not be trapped in failure in the underwater environment. Furthermore, an insulated clearance between the sealed chamber interlayer and the touch screen may be reserved all the time because the insulated fluid material will not be compressed easily in presence of a normal pressure of the underwater environment, and accordingly the touch control of the touch screen may be implemented when the finger of the human body applies the external force to the sealed chamber interlayer. The sealed shell is taken, in this way the sealing device has good pressure resistance and long service life.

The disclosure implements the underwater high-accuracy maneuverability of the touch screen of the electronic product, and may be widely applied to use and operation of the electronic product during underwater work/sports/recreation, have strong applicability, especially to the underwater manipulation (display, photographing, editing, handwriting and complete usage of other functions) of a plenty of smart electronic products (such as the smart cell phone) at present and bring a user nice, different and new experiences, with strong market prospect and social effect.

Figure 1:
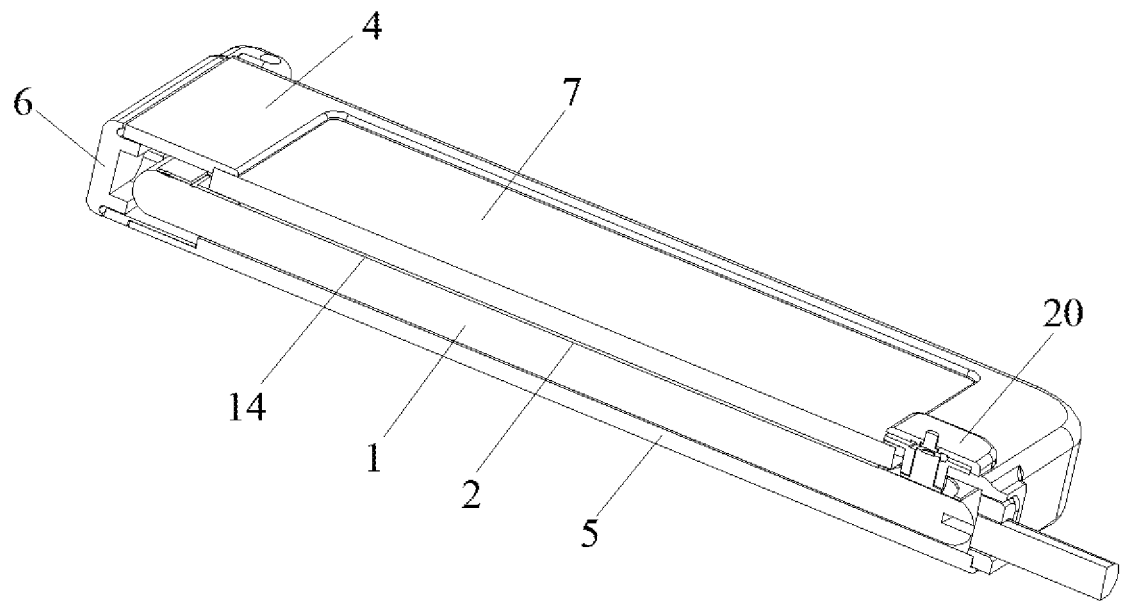
FIG. 1 is a structure diagram of a touch control system of an electronic product in underwater environment of the disclosure.

In the figure, 1-electronic product, 2-touch screen, 3-sealed shell, 4-top cover, 5-bottom cover, 6-side cover, 7-sealed chamber interlayer, 8-sealed chamber, 9-top insulated sealing film, 10-bottom insulated sealing film, 11-intermediate insulated sealing film, 12-separator, 13-inner insulated sealing film, 14-air clearance, 15-airbag, 16-air pipe, 17-connector, 18-lens cover, 19-mechanical button component, 20-induction button component, 21-button, 22-press block, 23-soft sealing gasket, 24-mobile clearance, 25-inductor, 26-guide body, 27-frame body.

DETAILED DESCRIPTION OF THE EMBODIMENTS

The technical solutions in embodiments of the disclosure will be clearly and completely described below in combination with drawings in the embodiments of the disclosure. It is apparent that the described embodiments are not all embodiments but part of the embodiments of the disclosure. All other embodiments obtained by those of ordinary skill in the art on the basis of the embodiments in the disclosure without creative work shall fall within the scope of protection of the disclosure.

It is to be noted that all directional indications (such as "upper", "down", "left", "right", "front", "behind", "top" and "bottom") in the embodiments of the disclosure are used to explain a relative position relationship, movement conditions and the like of all parts under a specific gesture (as shown in the drawings) only. If the specific gesture is changed, the directional indications should be changed accordingly. Furthermore, the technical solutions of all embodiments may be combined with each other on the premise that those of ordinary skilled in the art may implement the technical solutions. When a combination of the technical solutions is trapped in mutual contradiction or may not be implemented, it should be considered that the combination of the technical solutions does not exit and shall not fall within the scope of protection of the disclosure.

Figure 2:
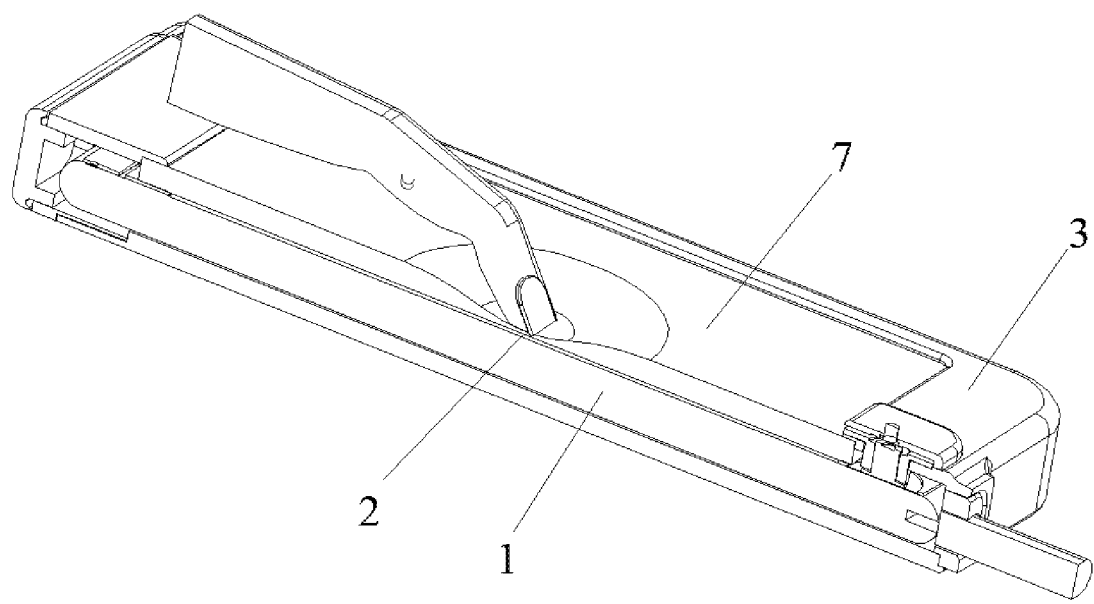
FIG. 2 is a structure diagram of a touch control system of an electronic product in underwater environment of the disclosure when touched and pressed.

As shown in FIG. 1 and FIG. 2, the disclosure provides a touch control system of an electronic product in underwater environment. The touch control system includes a sealing device which is configured to accommodate the electronic product 1. The sealing device includes a sealed chamber interlayer 7 and a sealed shell 3. Herein, the sealed chamber interlayer 7 is opposite to a touch screen 2 of the electronic product 1 and is capable of being pressed and rebounded and is transparent, and the sealed chamber interlayer 7 in a sealing manner. The sealed chamber interlayer 7 covers a surface of the touch screen 2 completely. The sealed shell 3 covers other surfaces of the electronic product 1, and implements touch control of the touch screen 2 by applying an external force to the sealed chamber interlayer 7. A sealed chamber 8 in the sealed chamber interlayer 7 is filled with an insulated fluid material. The sealed chamber interlayer 7 is filled with the insulated fluid material, so as to isolate water in the environment from the touch screen 2. The sealed shell 3 includes a top cover 4, a bottom cover 5 and a side cover 6 which cover all sides of the electronic product 1. The top cover 4, the bottom cover 5 and the side cover 6 may be integrally set, and alternatively connected in a sealing manner after being set in a split manner.

As shown in FIG. 1, a solid insulated sealing film material having certain softness and thickness is taken to produce a single sealed chamber interlayer 7 or multiple sealed chamber interlayers 7. The insulated fluid material is filled in the sealed chamber interlayer 7, and the single sealed chamber interlayer 7 or the multiple sealed chamber interlayers 7 completely cover the surface of the touch screen 2. In the underwater environment and under natural status, the single sealed chamber interlayer 7 or the multiple sealed chamber interlayers 7 isolate water drops or water in the environment from the touch screen 2 for more than a necessary distance (the distance is an effective distance of sensing of the touch screen). When a finger touches and presses a surface of the insulated sealing material farthest from the touch screen (the outermost), the sealing material at corresponding location is recessed, as shown in FIG. 2, and the insulated fluid material of the corresponding location is displaced until a distance from the finger to the touch screen 2 is less than the effective distance of sensing of the touch screen 2. At the moment, touch operation is formed. Otherwise, when the finger rises up and leaves, the insulated fluid material may flow back, and the sealed chamber interlayer 7 may rebound. When under the water, although a pressure of the water may stress the sealed chamber interlayer 7, the single sealed chamber interlayer 7 or the multiple sealed chamber interlayers 7 may be kept without deformation and may isolate the water drops or the water from influence to the touch screen 2 completely if the finger does not touch and press in the water environment because the insulated fluid material has extremely good resistance to compression and low volume compressibility and due to integral support of the surface of the touch screen 2 or the support of air in an air clearance and consistent water pressure at identical water depth. Therefore, the disclosure may be used under the water (such as diving, swimming and hot spring) and over the water (various climate environments, such as on a rainy day) at the same time.

Figure 3:
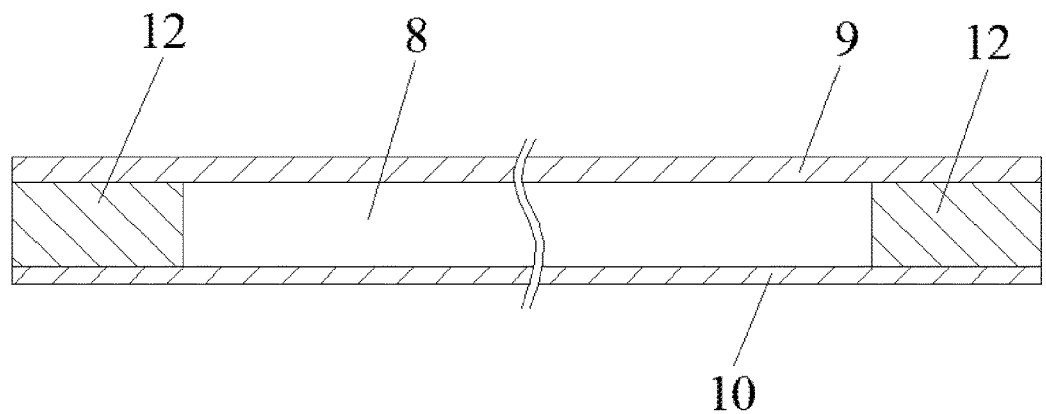
FIG. 3 is a structure diagram of a single sealed chamber interlayer in a first embodiment of the disclosure.

There are one or multiple layers of sealed chamber interlayers 7. FIG. 3 is a schematic diagram of the single sealed chamber interlayer 7 in a first embodiment of the disclosure. The single sealed chamber interlayer 7 includes a top insulated sealing film 9 and a bottom insulated sealing film 10. The top insulated sealing film 9 is a touch and press side, and the bottom insulated sealing film 10 is a side contacting with or close to the touch screen 2. The top insulated sealing film 9 is separated from the bottom insulated sealing film 10 through a separator 12. The separator 12 is arranged on an edge of the top insulated sealing film 9 or the bottom insulated sealing film 10, for supporting the top insulated sealing film 9. A sealed chamber 8 is surrounded by the top insulated sealing film 9, the bottom insulated sealing film 10 and the separator 12 jointly. A role of the separator 12 is to ensure that the insulated fluid material in the sealed chamber 8 achieves and maintains a required thickness. The separator 12, the top insulated sealing film 9 and the bottom insulated sealing film 10 are prepared from identical material.

Figure 4:
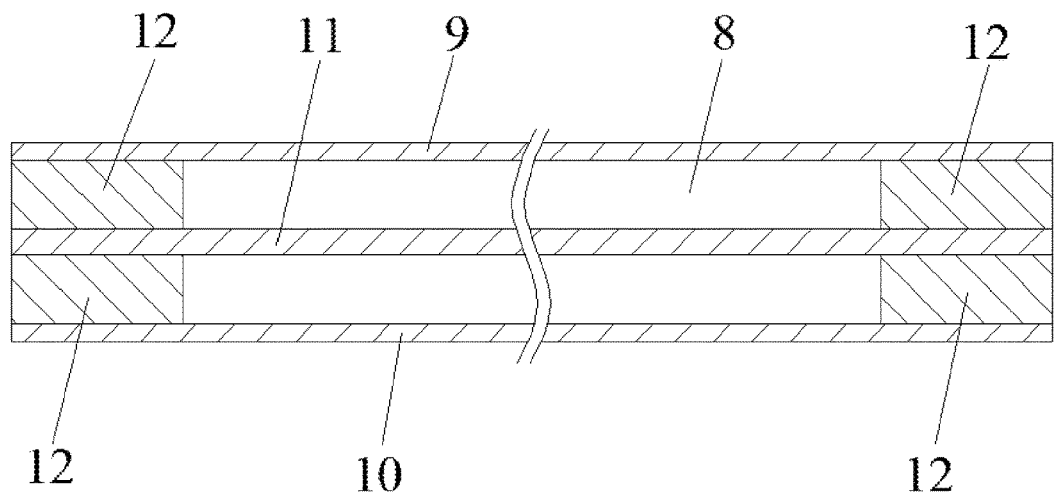
FIG. 4 is a structure diagram of multiple sealed chamber interlayers in a second embodiment of the disclosure.

FIG. 4 is a schematic diagram of the multiple sealed chamber interlayers 7 in a second embodiment of the disclosure. Besides a top insulated sealing film 9 which is located on a top and a bottom insulated sealing film 10 which is located on a bottom, the multiple sealed chamber interlayers 7 are provided with at least one intermediate insulated sealing film 11 which is located between the top insulated sealing film 9 and the bottom insulated sealing film 10. The sealed chamber 8 is arranged between the top insulated sealing film 9 and the intermediate insulated sealing film 11, or/and between two adjacent intermediate insulated sealing films 11, or/and between the intermediate insulated sealing film 11 and the bottom insulated sealing film 10. A separator 12 is arranged between two adjacent layers of the multiple sealed chamber interlayers 7 as well, and the separator 12, the intermediate insulated sealing film 11, the top insulated sealing film 9 and the bottom insulated sealing film 10 are prepared from the identical material. When touching and pressing, the top insulated sealing film 9 and the intermediate insulated sealing film 11 may be recessed normally due to ductility.

In the first embodiment and the second embodiment, the separator 12 and the top insulated sealing film 9 or the bottom insulated sealing film 10 or the intermediate insulated sealing film 11 may be molded through, but not limited to, adhesion or hot melt connection or ultrasonic welding or insert molding.

Figure 5:
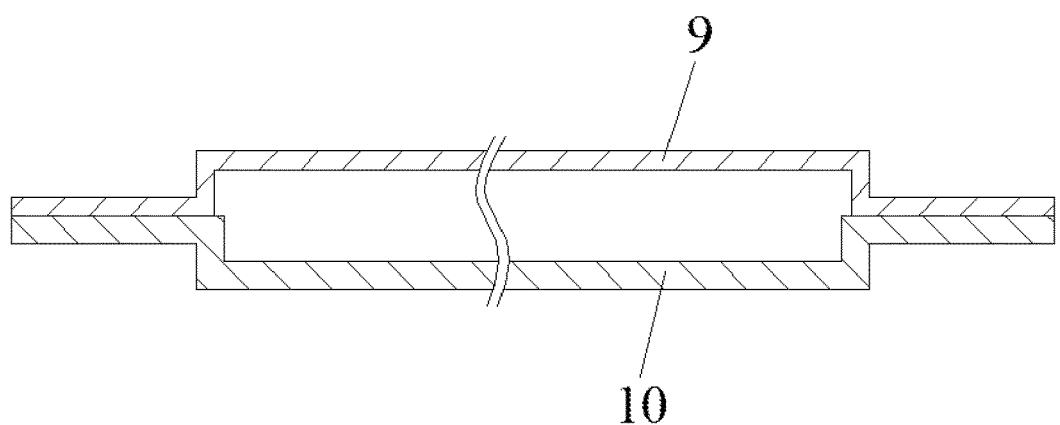
FIG. 5 is a schematic diagram of direct coupling of a top insulated sealing film and a bottom insulated sealing film in a third embodiment of the disclosure.

FIG. 5 is a schematic diagram of a third embodiment of the disclosure. In the embodiment, paired top insulated sealing films 9 or paired bottom insulated sealing films 10 or paired intermediate insulated sealing films 11 are subjected to the direct adhesion or the hot melt connection or the ultrasonic welding.

The insulated fluid material of the disclosure is fluid, transparent, non-flammable and non-explosive, not easy to fade away, and has stable chemical properties, high insulating performance (dielectric constant, dielectric loss), environmental protection, low volume compressibility, low coefficient of thermal expansion, specific gravity close to that of the water, freezing point $\leq 0°$ C., vaporization temperature $\geq 100°$ C. and other characteristics. The top insulated sealing film 9 is insulated, transparent, ductile and flat, and has strong water insulation and moisture insulation. The bottom insulated sealing film 10 is insulated, transparent and flat, and has strong water insulation and moisture insulation. The separator 12 is insulated and flat, and has strong water insulation and moisture insulation.

Under the water, there is a differential water pressure in a depth direction. When the sealing device is in a vertical status, a differential pressure between an upper end and a lower end of a sealed chamber interlayer 7 is about 10 $g/cm^2$, thereby generating an up and down differential thickness and accordingly making the touch screen trapped in failure. The whole water pressure is 5 $g/cm^2$ when it is 50 m deep, and a filling in the sealed chamber interlayer 7 may be maximally compressed. In this way, the thickness is thinning and a touch screen 2 is trapped in failure. While the invention specially takes the insulated fluid material which has the specific gravity close to that of the water (offsetting the up and down differential pressure in the vertical status) and extremely low compressibility. Silicone oil or glycerol or other fluid materials with ultralow conductivity and the specific gravity which is equivalent with that of the water is generally taken, such as methyl silicone oil or phenyl silicone oil. Therefore, the upper film and the lower film of the sealed chamber interlayer 7 are basically kept flat in the underwater environment whether the touch screen 2 of an electronic product 1 is placed horizontally or vertically.

In order to ensure effective touch, a thickness of a top insulated sealing film 9 and a bottom insulated sealing film 10 in the single sealed chamber interlayer 7 or a sum of the thicknesses of the top insulated sealing films 9, intermediate insulated sealing films 11 and the bottom insulated sealing films 10 in the multiple sealed chamber interlayers 7 is less than or equal to the effective distance of local sensing of the touch screen 2, and a thickness of the single sealed chamber interlayer 7 or the multiple sealed chamber interlayers 7 is greater than or equal to the effective distance of overall sensing of the touch screen 2, so as to ensure that the influence of water drops, the water and other conductive substances to normal touch of the touch screen 2 is fully isolated. Because there is difference in touch sensitivity (effective distances of local and overall sensing) of the touch screen 2, parameters may be acquired from a touch screen 2 manufacturer, or actual parameters of its effective distances of local and overall sensing may be acquired through a test (with different added thickness and total thickness).

In the disclosure, the sum of the thicknesses of the top insulated sealing film 9 and the bottom insulated sealing film 10 is 0.2 mm and above and 1.0 mm and below, and the total thickness of the single sealed chamber interlayer 7 is 5 mm and below.

Taking the touch screen 2 of the electronic product 1 (IPHONE 7) for instance, the top insulated sealing film 9 and the intermediate insulated sealing film 11 take a waterproof, moist insulation and transparent Thermoplastic Urethane (TPU) elastomer film, the bottom insulated sealing film 10 takes a waterproof and moist insulation Polythylene Terephthalate (PET) film with the added thickness of 0.5 mm. an insulated fluid material uses methyl silicone oil (main parameters: colorless and transparent; relative density=0.97, flashing point=315° C., coefficient of volume thermal expansion=9.4*10-4, volume resistivity=1*10^15, dielectric constant=2.75, tangent value of dielectric loss <1*10$^{-4}$, freezing point=−50° C., viscosity=1000CST, specific gravity=0.975), and the total thickness of the whole sealed chamber interlayer 7 is 3.0 mm.

Figure 6:
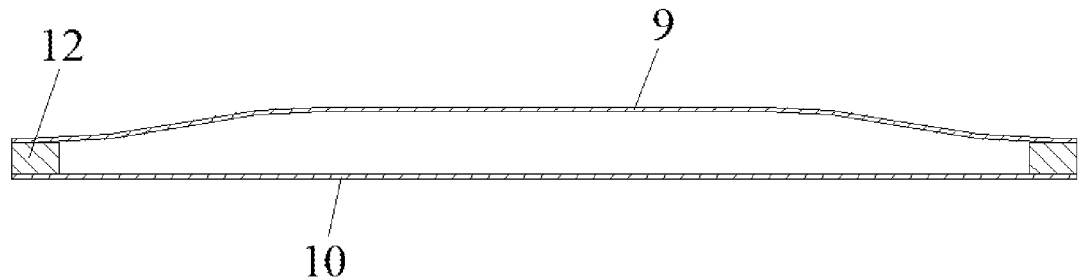
FIG. 6 is a schematic diagram of slight bulging of a top insulated sealing film of the disclosure.
Figure 7:
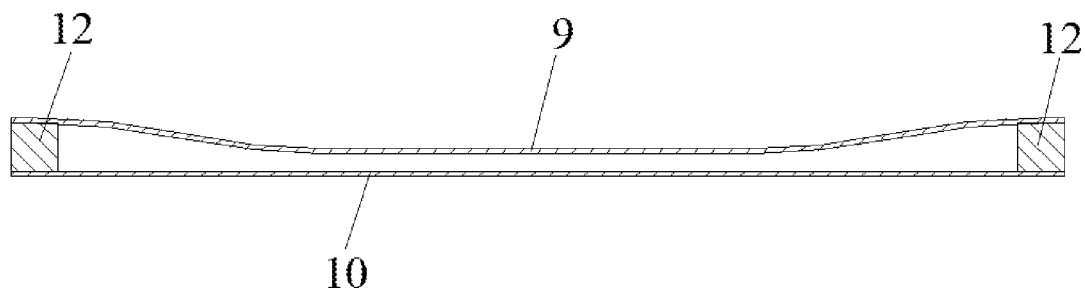
FIG. 7 is a schematic diagram of slight recessing of a top insulated sealing film of the disclosure.

The insulated fluid material has certain coefficient of thermal expansion. In order to ensure that the mentioned total thickness of the insulated fluid material at a low temperature (−20° C. to 20° C.) is not less than the required thickness after shrinking, the following three methods are taken to design and manufacture: (1) during manufacturing at a normal temperature, the insulated fluid material is filled appropriately to make the top insulated sealing film 9 slightly bulge. As shown in FIG. 6, the top insulated sealing film 9 has ductility and will not be damaged. When an ambient temperature falls as low as −20° C., the insulated fluid material may shrink, thereby making the top insulated sealing film 9 return to a flat status or recess slightly. However, its minimum total thickness is not less than the required thickness. (2) During manufacturing at the normal temperature, the separator 12 is thickened appropriately, and the top insulated sealing film 9 is basically flat when the insulated fluid material is filled. When the ambient temperature falls as low as −20° C., the insulated fluid material may shrink, thereby making the top insulated sealing film 9 recess, as shown in FIG. 7. However, its minimum total thickness is not less than the required thickness. (3) A method between the two may be involved. Taking methyl silicon oil which is used as the insulated fluid material for instance, the coefficient of thermal expansion of the methyl silicon oil is 9.4*10$^{-4}$, and its temperature is at 20° C. during manufacturing and filling. When the ambient temperature is at −20° C., volume shrinkage of the insulated fluid material may achieve 3.76%.

When the ambient temperature is at 20° C.-80° C. (for example, hot weather, hot spring, special transport or placement environment), a volume of the insulated fluid material will swell. Taking methyl silicon oil which is taken as the insulated fluid material for instance, the volume expansion may achieve 7.52%. Therefore, a maximum expansion rate of the top insulated sealing film 9 is greater than or equal to 50%.

Figure 8:
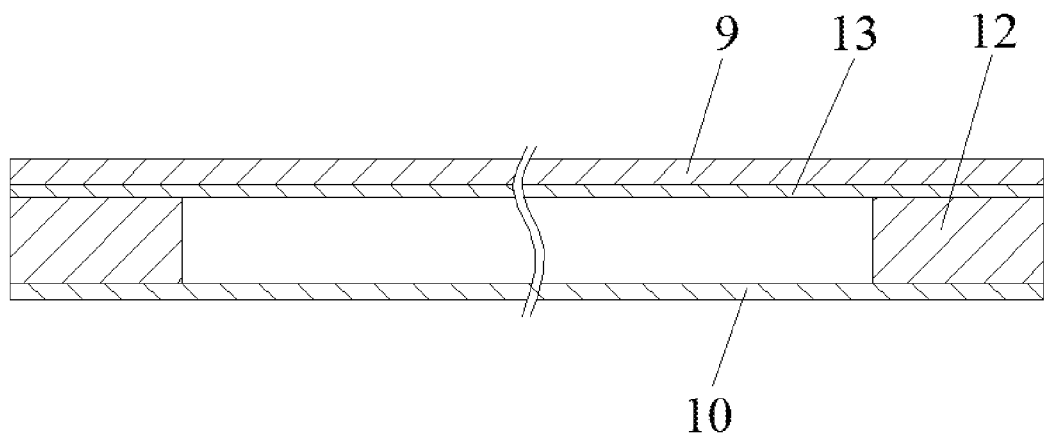
FIG. 8 is a schematic diagram of an inner insulated sealing film arranged inside a top insulated sealing film in a fourth embodiment of the disclosure.

FIG. 8 is a schematic diagram of an inner insulated sealing film 13 arranged inside a top insulated sealing film 9 in a fourth embodiment of the disclosure. A touch side, namely the top insulated sealing film 9 is pressed and slid repeatedly in use, the top insulated sealing film 9 may be worn and even cracked due to aging, and accordingly an electronic product 1 may be damaged because of water in the environment entering into the device. In order to avoid the mentioned risks, a wearable and anti-aging top insulated sealing film 9 may be selected. As an alternative, the top insulated sealing film 9 may take a dual-layer design. An inner insulated sealing film 13 is arranged inside the top insulated sealing film 9 and adhered to the top insulated sealing film 9. When the top insulated sealing film 9 is cracked due to oxidization or wearing, a device should be stopped or replaced, and the inner insulated sealing film 13 may prevent the water from entering into the device because it is not worn and aged yet.

Figure 9:
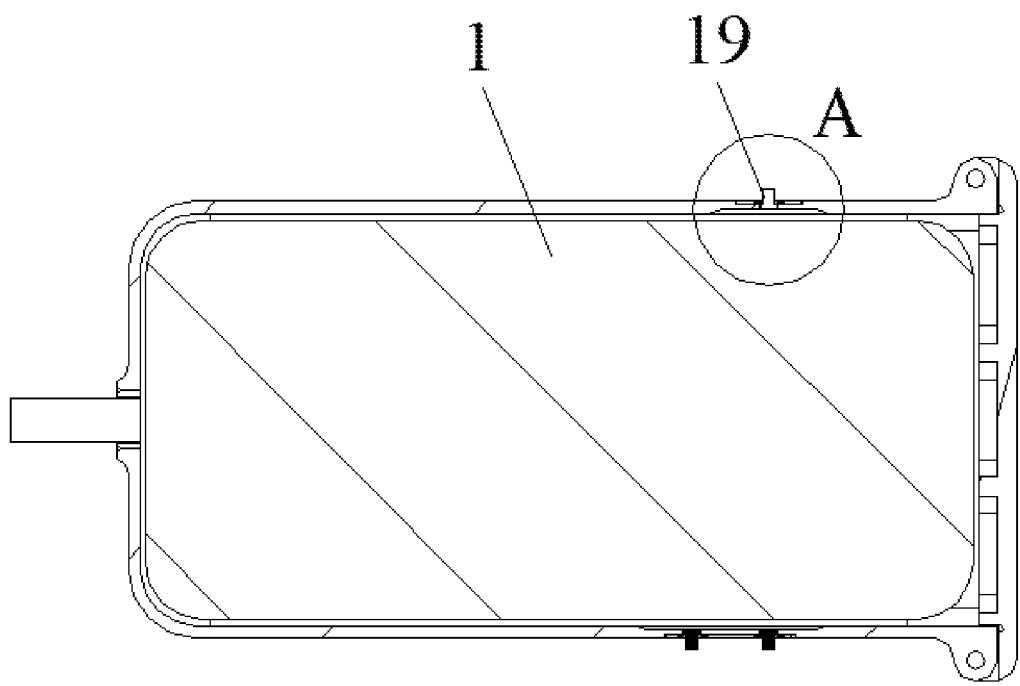
FIG. 9 is a structure diagram of a mechanical button component arranged on a sealing device of the disclosure.
Figure 10:
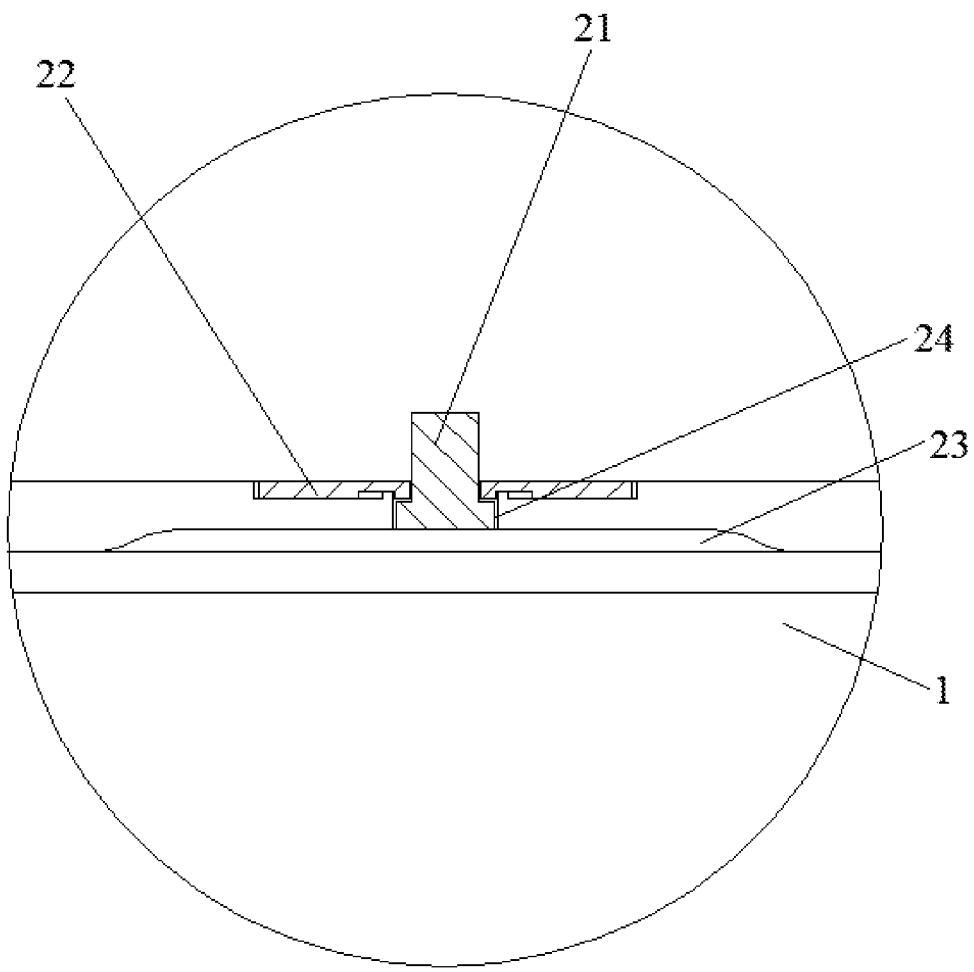
FIG. 10 is a partial enlarged drawing of an A place in FIG. 9.

As shown in FIG. 9 and FIG. 10, in coordination with use of an electronic product 1, a sealing device is provided with a mechanical button component 19 corresponding to a mechanical key of the electronic product 1, such as a power key or a volume button of the electronic product 1. The mechanical button component 19 includes a button 21, a press block 22 and a soft sealing gasket 23. The button 21 is subjected to press fit on a sealed shell 3 by the press block 22, and is sealed with the mechanical key by the soft sealing gasket 23. The press block 22 and the soft sealing gasket 23 are fixed on the sealed shell 3 through the adhesion or the hot melt connection or the ultrasonic welding or the insert molding or other ways. In this way, the button 21 will not run outward or inward. The soft sealing gasket 23 is fixedly connected with the sealed shell 3 fully, thereby preventing the water of the environment from entering into the sealing device. A mobile clearance 24 is arranged between the button 21 and the press block 22 and the sealed shell 3, so as to facilitate successful recessing and restoring of the button 21 when pressed. Enough mobile clearance 24 is designed between the button 21 and the sealed shell 3, the soft sealing gasket 23 may be elastically deformed when the button 21 is pressed, and the mechanical key of the electronic product 1 may be triggered upon pressing stroke design of the button 21 when a sealing status is maintained.

Figure 11:
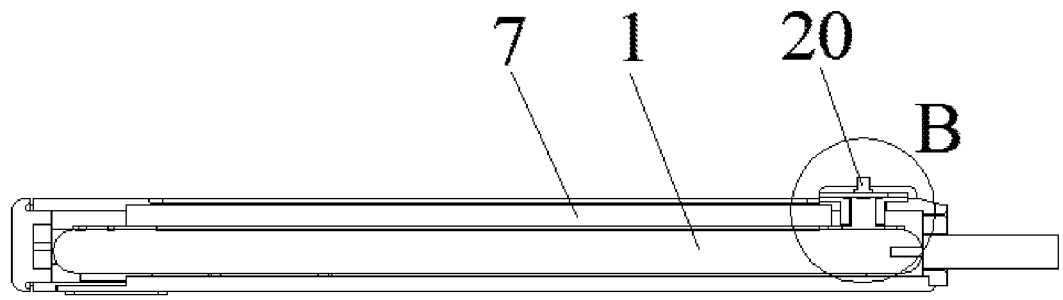
FIG. 11 is a structure diagram of an induction button component arranged on a sealing device of the disclosure.
Figure 12:
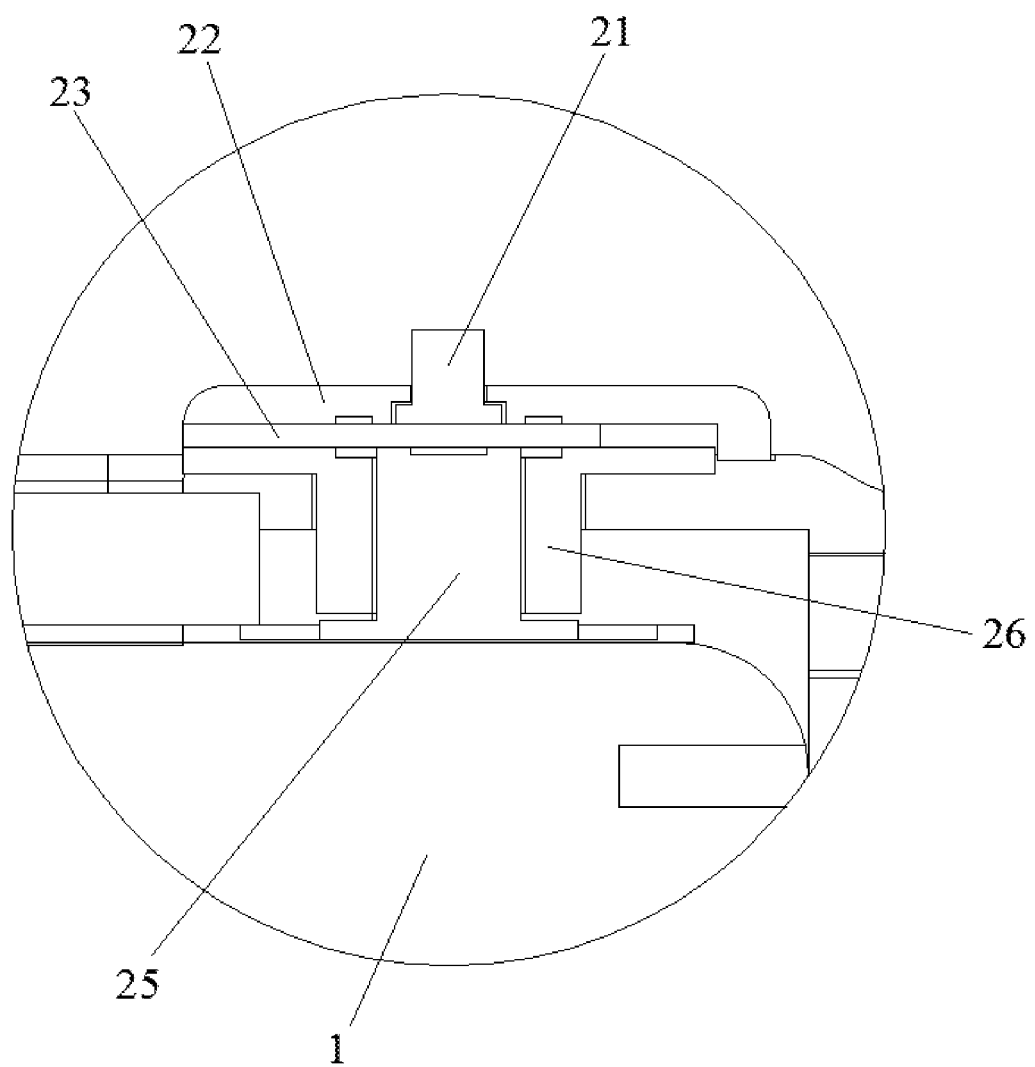
FIG. 12 is a partial enlarged drawing of a B place in FIG. 11.

As shown in FIG. 11 and FIG. 12, in coordination with use of the electronic product 1, the sealing device is further provided with an induction button component 20 corresponding to an induction key of the electronic product 1, such as a HOME key of the electronic product 1. The induction button component 20 includes the button 21, the press block 22, the soft sealing gasket 23, a guide body 26 and an inductor 25. The button 21 is subjected to press fit between the press block 22 and the soft sealing gasket 23, in this way the button 21 will not run outward or inward. The soft sealing gasket 23 and the press block 22 are fixed on the sealed shell 3, thereby ensuring that the water will not enter into the sealing device. The inductor 25 is fixed between the soft sealing gasket 23 and the induction key. When pressing the button 21, the button 21 may push the soft sealing gasket 23 and the inductor 25 to move toward the induction key to trigger the induction key because the soft sealing gasket 23 has extremely nice ductility. When stopping pressing the button 21, the soft sealing gasket 23 and the inductor 25 restore to original locations.

One side of the soft sealing gasket 23 facing the induction key is connected with the guide body 26. The guide body 26 is fixed on the sealed shell 3 and is located around the inductor 25. The inductor 25 is guided by the guide body 26 to move. Furthermore, the guide body 26 and the soft sealing gasket 23 jointly form a sealed structure which ensures that the water will not enter into the sealing device. In the embodiment, the press block 22, the soft sealing gasket 23 and the guide body 26 are fixed on the sealed shell 3 through the adhesion or the hot melt connection or the ultrasonic welding or the insert molding and other ways.

The soft sealing gasket 23 is prepared from a material with extremely good ductility, such as silica gel. The inductor 25 is prepared from a solid conductive material, such as stainless steel, copper, conductive rubber. The guide body 26, the button 21 and the press block 22 are prepared from a solid material, such as plastic. In order to ensure pressure resistance, a rigid shell is taken as the sealed shell 3.

Under the water, the electronic product 1 may be triggered by mistake because the mechanical key and the induction key may be pressed due to the pressure of the water. Design is implemented on the premise that error triggering due to the pressure of the water will not occur at 10 m deep (one bar pressure=1 bar=1 kg/cm$^2$). A trigger force of the mechanical key and the induction key of the electronic product 1 is A g, and a reversed elastic force of the soft sealing gasket 23 is B g when pressed and triggered, a cross sectional area of the button 21 and the inductor 25+a coordinating clearance is C (mm$^2$), and $((A+B)/C)*100>=1000$ g/cm$^2$. Taking Huawei P9 cell phone for instance, the trigger force of the mechanical key of the electronic product 1 is 150 g, the reversed elastic force of the soft sealing gasket 23 is 20 g, and the cross sectional area <=17 mm$^2$.

In one of the embodiments, the sealed chamber interlayer 7 is close to the surface of the touch screen 2, namely the bottom insulated sealing film 10 is close to the surface of the touch screen 2 and leans against the touch screen 2, without needing air inflation. At the moment, the sealing device is applicable to shallow environment only, and the specific depth of the water should be limited to a circumstance in which the sealed shell 3 would not directly press the touch screen 2 of the electronic product 1 in the sealed shell 3 due to compressive deformation under the water. When pressing the sealed chamber interlayer 7 locally, the insulated fluid material in the pressed part may be displaced by the pressure, so as to implement touch control of the touch screen 2 of the electronic product 1.

In another embodiment, an air clearance 14 with uniform thickness is arranged between a surface of a bottom insulated sealing film 10 close to a touch screen 2 and the touch screen 2. A thickness of the air clearance 14 is 0.2 mm and above, preferably 0-0.8 mm. A role of the air clearance 14 is to not only make a sealed chamber interlayer 7 isolate the water from the touch screen 2, but contact with the touch screen 2 when a top insulated sealing film 9 is pressed and recessed by the finger so as to implement touch operation and control of an electronic product 1 and prevent the electronic product from error operation because the touch screen 2 is touched by the sealed chamber interlayer 7 continuously. The air clearance 14 communicates with a charging/discharging device outside a sealing device. A size of a chamber which is configured to accommodate the electronic product 1 in a sealing device is greater than an overall size of the electronic product 1, and the clearance is reserved between the two, for ventilation between the charging/discharging device and the air clearance 14.

Figure 13:
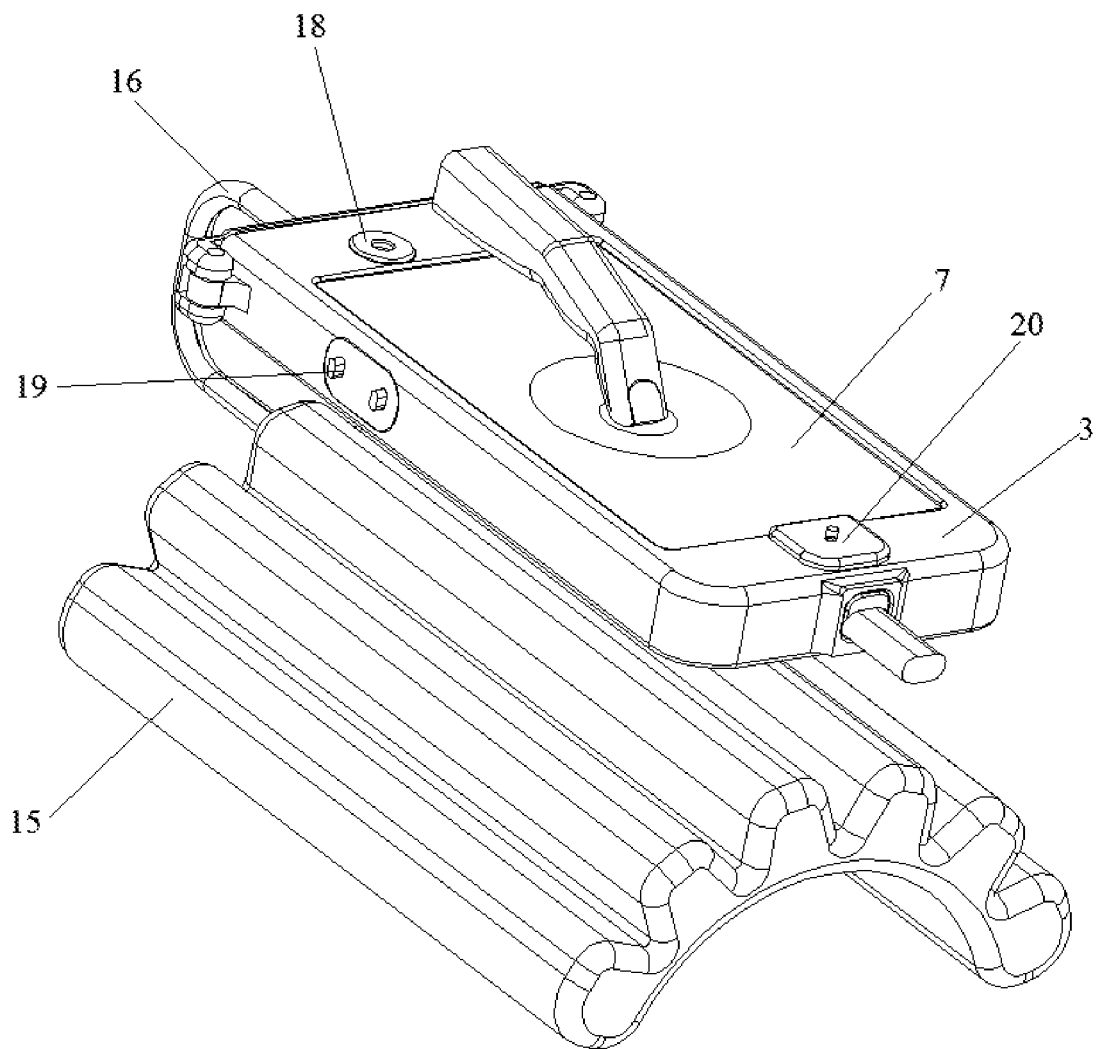
FIG. 13 is a structure diagram of a sealing device connecting with an airbag through an air pipe in a fifth embodiment of the disclosure.

As shown in FIG. 13, in the embodiment, the charging/discharging device is one or more sealed and soft airbags 15. Rigidity or tension of the material of the airbag 15 is less than that of the material of the sealed chamber interlayer 7 and a sealed shell 3. When there are multiple airbags 15, the multiple airbags 15 communicate with the sealing device in series or in parallel. In the embodiment, the airbag 15 communicates with the sealing device through an air pipe 16, and the air pipe 16 is connected with the airbag 15 and the sealing device through connectors 17 in a fastening manner. The connector 17 is permanently or detachably connected with the sealing device. When the connector 17 is not connected with the air pipe 16, an interface of the connector 17 is plugged with a plugging head. In another embodiment, part of airbag 15 communicates with a sealing device through the air pipe 16, and another part of the airbag 15 is directly connected with a sealing device in a sealing manner. In other embodiments, as an alternative, the airbag 15 may be set integrally with the sealing device and covers external surfaces of other parts of the sealing device, except locations corresponding to operable functional parts of the electronic product 1. An edge or a side of the sealing device communicates with the airbag 15.

At least one of the airbags 15 is configured as a shape which may be worn on a human body. The airbag 15 may be fixed at the required location, such as an arm and other parts of the human body through a quick and easy fixation way, for example, a magic tape, a silica gel bandage, a rubber bandage and other usual fixation ways. Preferably, at least one of the airbags 15 is configured as a wrist strap which may be detachably worn on a wrist of the human body. The stretchable, telescopic or elastically helical air pipe 16 may be taken. The air pipe 16 may be elongated and shortened freely, so as to facilitate free use of the sealing device.

The airbag 15 is prepared from a soft, wearable and corrosion-resistant material with extremely good ductility, such as the silica gel and soft rubber. Rigidity of the sealed shell 3> the rigidity of the air pipe 16> the rigidity of the sealed chamber interlayer 7. The rigidity of the airbag 15 is close to that of the sealed chamber interlayer 7, and the former is preferably greater than the latter. In the underwater environment, air in the airbag 15 may enter into the sealed shell 3 through the air pipe 16 due to the pressure of the water, and accordingly the pressure in the sealing device may be adjusted synchronously to be consistent with the pressure of ambient water during floating and diving. In this way, the sealing device, the electronic product 1 and the touch screen 2 thereof may not be damaged when subjected to a small pressure of the ambient water, and the sealed chamber interlayer 7 may be ensured to be in a flat status when not operated. The sealed chamber interlayer 7 slightly contacts with the touch screen 2 of the electronic product 1, or the slight air clearance 14 is reserved to facilitate operation on the touch screen 2 and avoiding damage. Meanwhile, a mechanical button component 19 and an induction button component 20 will not trigger the electronic product 1 by mistake.

The applicable water depth may be calculated as follows when the sealed shell 3 is connected with the airbag 15: the volume (over the water) of the air in the airbag 15 is defined as D, the volume (over the water) of the air in the air pipe 16 is defined as E, the volume (over the water) of the air in the sealing device is defined as F, a maximum applicable water depth (m)=(D+E+F)/(E+F)*10. If the design maximum water depth is 50 m, D=4*(E+F).

Figure 14:
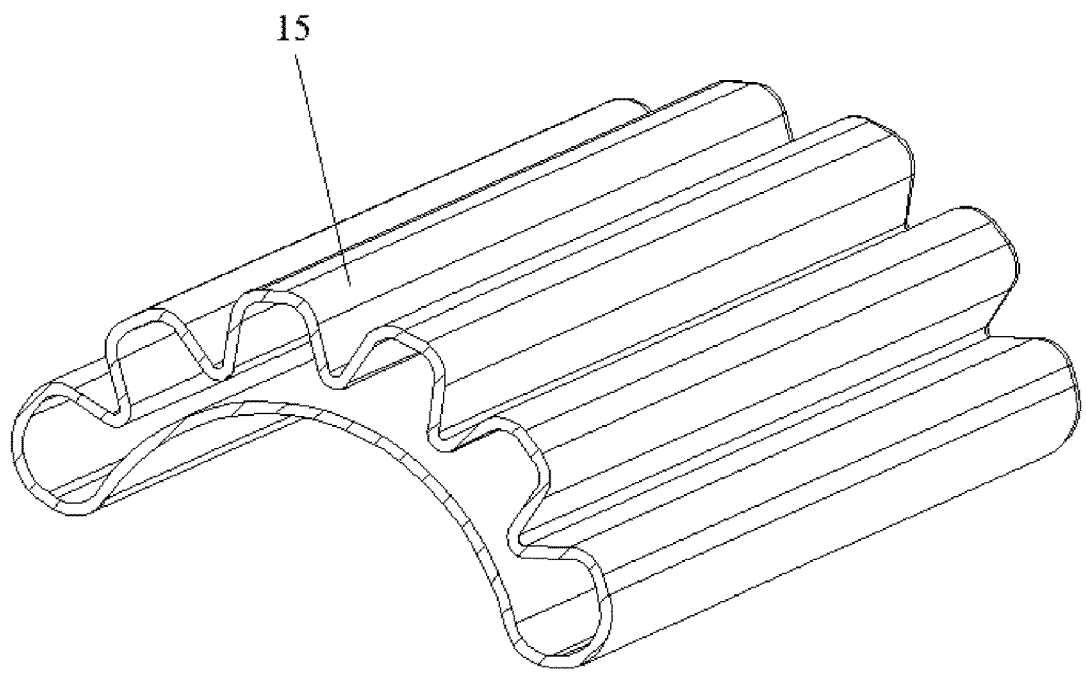
FIG. 14 is a section diagram of an airbag in FIG. 13.

FIG. 14 is a cross section of one kind of airbag 15. Part of a surface of the airbag 15 is rough and uneven, and a space is reserved between a concave part of the airbag 15 and a wall of the airbag 15 on another side, to facilitate connection and ventilation of air in the airbag 15. Meanwhile, the whole airbag 15 is kept tidy and may be fixed easily in bending and binding manners.

The overall blow molding, or the split-type hot melt connection or the ultrasonic welding or the adhesion is applied to the airbag 15 in the disclosure.

In other embodiments, a charging/discharging device includes a high-pressure cylinder, a water pressure sensor and a charging/discharging valve. Along a change of a water depth, air is charged into and discharged from a sealing device through the charging/discharging device, thereby balancing an internal pressure and an external pressure of a sealing device, and accordingly keeping a sealed chamber interlayer 7 flat all the time.

In fact, the disclosure is not limited to the mentioned embodiments, and may have other variations based on the identical inventive concept. For example, other decorative or entertainment additives may be added to the insulated fluid material on the premise of not influencing functions of the sealed chamber interlayer 7.

Figure 15:
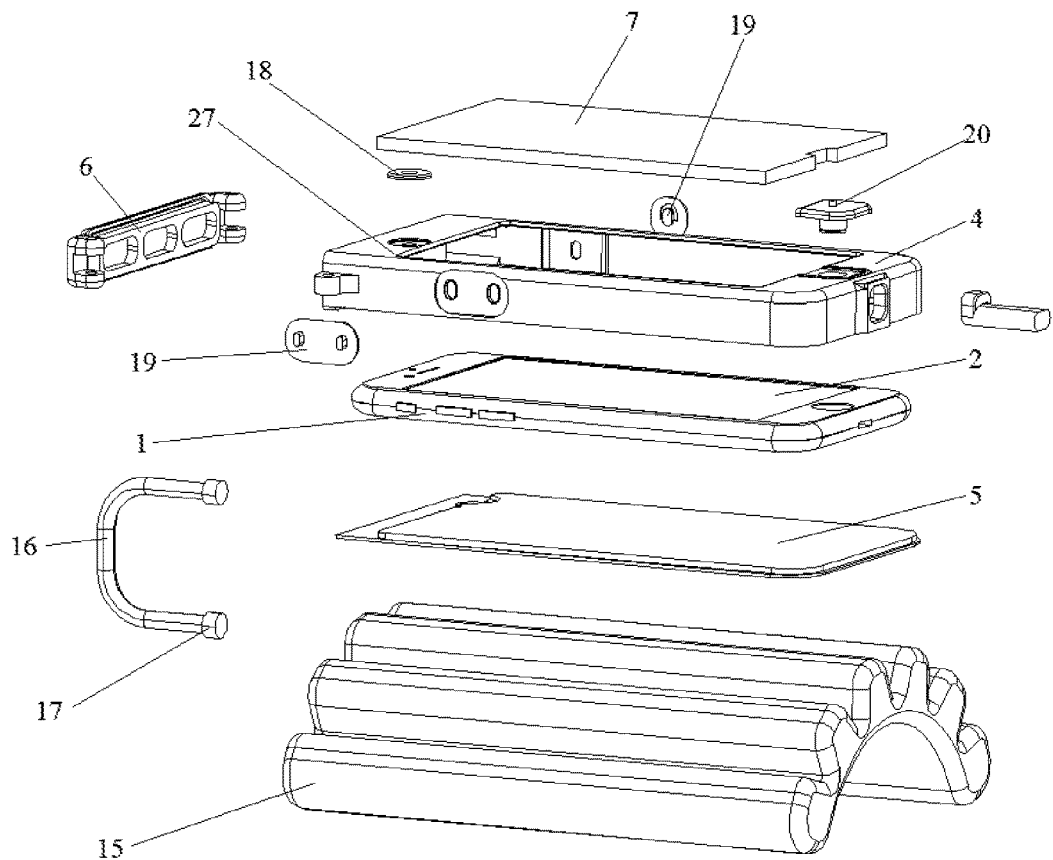
FIG. 15 is an exploded stereogram of FIG. 13.

As shown in FIG. 15, a top cover 4 and part of a side cover 6 of the sealed shell 3 integrally form a frame body 27, and the frame body 27 surrounds the sealed chamber interlayer 7 on the peripheral edge of the sealed shell 3 in a sealing manner to ensure tightness of a connecting place. A location of the sealed shell 3 opposite to a power button of the electronic product 1 is hollow, and a power switch protective film which is capable of being pressed and rebounded is embedded at a hollow place in a sealing manner. The power switch protective film may be prepared from a material which is identical with that of the sealed chamber interlayer 7. The part of the sealed shell 3 opposite to a camera of the electronic product 1 is provided with a nonopaque lens cover 18. The part of the sealed shell 3 corresponding to an acoustic output or/and receiving location of the electronic product 1 is thinner than any other part, so as to facilitate transmission of acoustic wave.

The touch control system of the electronic product in the underwater environment provided by the disclosure is provided with the sealed chamber interlayer 7 at corresponding location of the touch screen 2 of the electronic product 1. When pressing the sealed chamber interlayer 7, the insulated fluid material of the pressed part may be displaced in a flowing manner, thereby implementing the touch control of the touch screen 2 of the electronic product 1. When pressing is canceled, the insulated fluid material may flow back naturally, each insulated sealing film restores to be flat and have the clearance, and accordingly touch control may disappear. In this way, the electronic product may be protected and accurately controlled under various environments. The sealed shell 3 is taken, and accordingly the sealing device has good pressure resistance and long service life.

The above embodiments are used to describe the technical solutions of the disclosure only and are not intended to limit the disclosure. Although the disclosure is expatiated by using the preferred embodiments, it is to be understood that any variations or replacements of the technical solutions of the disclosure by those skilled in the art without departing from the tenet and the scope of the technical solutions shall fall within the scope of protection of the disclosure.

What is claimed is:

1. A touch control system of an electronic product in underwater environment, comprising a sealing device which is configured to accommodate the electronic product, the sealing device comprising a sealed chamber interlayer and a sealed shell, wherein the sealed chamber interlayer is opposite to a touch screen of the electronic product and is capable of being pressed and rebounded and is transparent, and the sealed shell is connected with the sealed chamber interlayer in a sealing manner, the sealed chamber interlayer covers a surface of the touch screen completely, the sealed shell covers other surfaces of the electronic product, and implements touch control to the touch screen by applying an external force to the sealed chamber interlayer, and a sealed chamber in the sealed chamber interlayer is filled with an insulated fluid material;

wherein there are one or more sealed chamber interlayers, a single sealed chamber interlayer is provided with a top insulated sealing film and a bottom insulated sealing film, and multiple sealed chamber interlayers are further provided with at least one intermediate insulated sealing film which is positioned between the top insulated sealing film and the bottom insulated sealing film, and the sealed chamber is arranged between the top insulated sealing film and the bottom insulated sealing film, or/and between the top insulated sealing film and the intermediate insulated sealing film, or/and between two adjacent intermediate insulated sealing films, or/and between the intermediate insulated sealing film and the bottom insulated sealing film;

wherein thickness of the top insulated sealing film and the bottom insulated sealing film in the single sealed chamber interlayer or a sum of the thicknesses of the top insulated sealing films, the intermediate insulated sealing films and the bottom insulated sealing films in the multiple sealed chamber interlayers is less than or equal to an effective distance of local sensing of the touch screen, and a thickness of the single sealed chamber interlayer or the multiple sealed chamber interlayers is greater than or equal to the effective distance of overall sensing of the touch screen;

wherein an air clearance with uniform thickness is arranged between a surface of the sealed chamber interlayer close to the touch screen and the touch screen, and the air clearance communicates with a charging/discharging device outside the sealing device.

2. The touch control system of an electronic product in underwater environment as claimed in claim 1, wherein the top insulated sealing films or the bottom insulated sealing films or the intermediate insulated sealing films are separated through a separator, respectively, the separator is arranged on an edge of the top insulated sealing film or the bottom insulated sealing film or the intermediate insulated sealing film, for supporting the top insulated sealing film or the intermediate insulated sealing film.

3. The touch control system of an electronic product in underwater environment as claimed in claim 1, wherein the sum of the thicknesses of the top insulated sealing film and the bottom insulated sealing film is 0.2 mm and above, and 1.0 mm and below, and a total thickness of the single sealed chamber interlayer is 5 mm and below.

4. The touch control system of an electronic product in underwater environment as claimed in claim 1, wherein a thickness of the air clearance is 0-0.8 mm.

5. The touch control system of an electronic product in underwater environment as claimed in claim 1, wherein the charging/discharging device is one or more sealed airbags, and rigidity or tension of a material of the airbag is less than that of the material of the sealed chamber interlayer and the sealed shell.

6. The touch control system of an electronic product in underwater environment as claimed in claim 5, wherein the airbag is set integrally with the sealing device and covers external surfaces of other parts of the sealing device, except locations corresponding to operable functional parts of the electronic product; and the edge or the side of the sealing device communicates with the airbag.

7. The touch control system of an electronic product in underwater environment as claimed in claim 5, wherein the airbag communicates with the sealing device through an air pipe, and the air pipe is connected with the airbag and the sealing device through connectors in a fastening manner.

8. The touch control system of an electronic product in underwater environment as claimed in claim 1, wherein a location of the sealed shell opposite to a power button of the electronic product is hollow, and a power switch protective film which is capable of being pressed and rebounded is embedded at a hollow place in a sealing manner.

9. The touch control system of an electronic product in underwater environment as claimed in claim 1, wherein the sealing device is provided with a mechanical button component corresponding to a mechanical key of the electronic product.

10. The touch control system of an electronic product in underwater environment as claimed in claim 9, wherein the mechanical button component comprises a button, a press block and a soft sealing gasket, the button is subjected to press fit on the sealed shell by the press block, and the place between the button and the mechanical key is sealed by the soft sealing gasket.

11. The touch control system of an electronic product in underwater environment as claimed in claim 1, wherein the sealing device is provided with an induction button component corresponding to an induction key of the electronic product.

12. The touch control system of an electronic product in underwater environment as claimed in claim 11, wherein the induction button component comprises a button, a press block, a soft sealing gasket and an inductor, the button is subjected to press fit between the press block and the soft sealing gasket, the soft sealing gasket and the press block are fixed on the sealed shell, and the inductor is fixed between the soft sealing gasket and the induction key, and when pressing the button, the soft sealing gasket and the inductor are pushed to move, thereby triggering the induction key.

* * * * *